June 24, 1969     R. L. LICH     3,451,356
RESILIENTLY CENTERED RAILWAY MOTOR TRUCK
Filed Aug. 10, 1967

INVENTOR:
RICHARD L. LICH
BY Bedell & Burgess
ATTORNEYS.

United States Patent Office 3,451,356
Patented June 24, 1969

3,451,356
RESILIENTLY CENTERED RAILWAY MOTOR TRUCK
Richard L. Lich, Town and Country, Mo., assignor to General Steel Industries, Inc., Granite City, Ill., a corporation of Delaware
Filed Aug. 10, 1967, Ser. No. 659,722
Int. Cl. B61c 17/00; B61f 1/14, 13/00
U.S. Cl. 105—136                    12 Claims

ABSTRACT OF THE DISCLOSURE

A railway motor truck comprising three wheeled axles, a rigid frame resiliently supported directly on the axles, a pair of transversely spaced upwardly facing horizontal bearing surfaces on the frame between the middle axle and each end axle and adapted to slidably engage vertically movable spring loaded shoes depending from a supported locomotive underframe and slidably engaging said bearing surfaces to provide a resilient support thereon for the underframe, a vertically cylindrically apertured block mounted in said truck frame near its upper surface and resiliently centered transversely of said truck frame but being unrestrained lengthwise of the truck and being adapted to pivotally and vertically slidably receive a cylindrical post depending from the underframe, a second cylindrically apertured block beneath said first named block at a substantially lower lever, said second block being restrained against any movement lengthwise of the truck but being freely movable transversely of the truck and adapted to pivotally receive the lower part of the cylindrical post whereby tractive forces are transmitted therethrough from said truck to the supported underframe at lower level than the first block.

Field of the invention

The invention relates to railway rolling stock and consists particularly in a railway motor truck for locomotives in which the locomotive underframe is spring supported directly on the truck frame with lateral centering means at a higher level than the axles, and means for transmitting tractive forces from the truck to the locomotive at a substantially lower level.

Description of the prior art

In conventional motor trucks of the type in which the body is pivotally supported by loaded center plates on a laterally movable bolster carried by springs supported from the truck frame, tractive forces are transmitted from the truck frame to the body through the center plates, which are necessarily at a higher level than the axles to vertically clear the motor. Since tractive force is applied to the truck frame through the axles, there is a tendency of the truck frame to tilt longitudinally about the center plate as a fulcrum with resultant unloading of some of the axles and additional loading of the other axle or axles.

Summary of the invention

The invention solves the problem of load transference described above in trucks where the body is spring supported directly on the truck frame, by having the body pivot member pivotally received in a member centered transversely of the truck but free longitudinally of the truck near the top level of the truck frame and extending downwardly into pivotal relation with an element substantially below the top level, e.g., at axle level, and transversely movable but longitudinally fixed with respect to the truck frame, so as to transmit longitudinal forces from the truck to the body at this level while permitting free swivel, lateral and vertical movements between truck and body.

Description of the preferred embodiment

Figure 1:
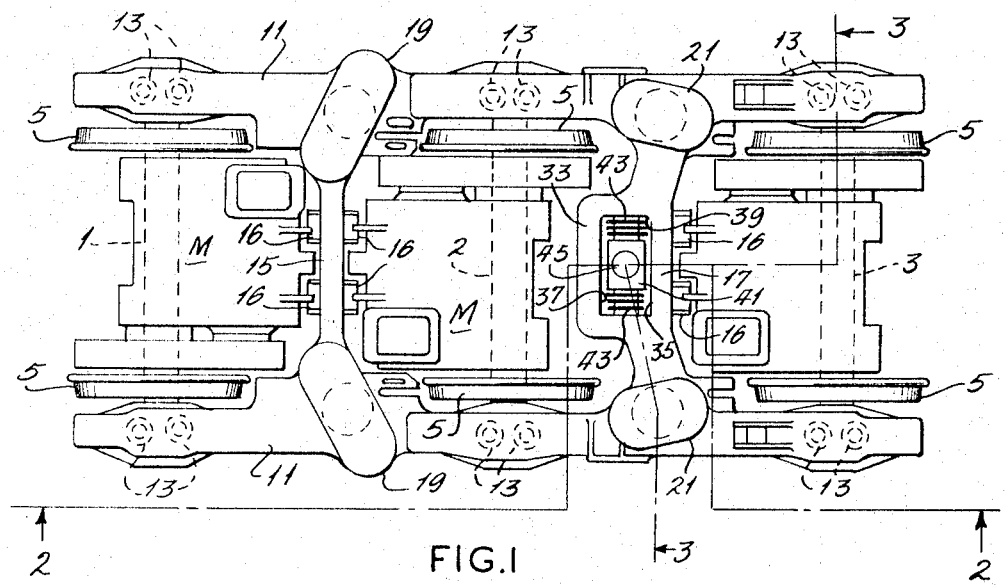
FIG. 1 is a top view of a truck embodying the invention.
Figure 2:
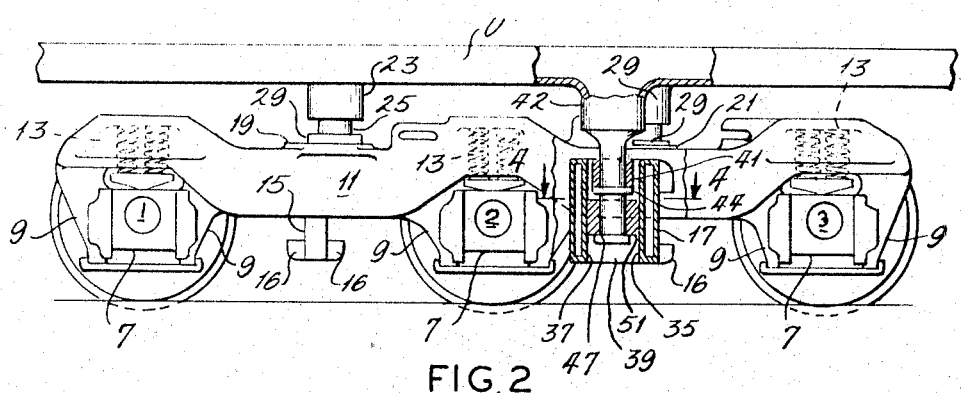
FIG. 2 is a side elevational view, partially sectionalized, along line 2—2 of FIG. 1.
Figure 3:
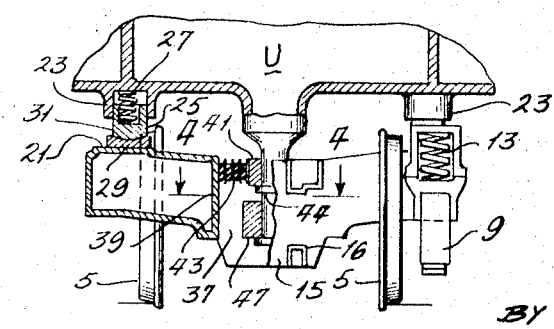
FIG. 3 is a transverse vertical sectional view along line 3—3 of FIG. 1.
Figure 4:
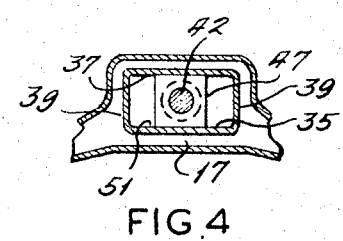
FIG. 4 is a fragmentary horizontal sectional view along lines 4—4 of FIGS. 2 and 3.

The truck comprises three spaced axles 1, 2 and 3, each rigidly mounting a pair of transversely spaced flanged wheels 5. Journal boxes 7 are rotatably mounted on the ends of each axle and are vertically slidably received in jaws formed between pedestal legs 9 of transversely spaced longitudinally extending truck frame side members 11. Coil springs 13 supported on boxes 7 extend upwardly into pockets in side members 11 whereby to resiliently support the truck side members 11 on the axles. Between end axle 1 and middle axle 2, and between middle axle 2 and end axle 3, side members 11 are rigidly connected by transverse transom members 15 and 17 respectively.

Transom 15 is provided with motor support brackets 16 on both of its sides, facing axles 1 and 2, and transom 17 has similar brackets on one side only, facing axle 3. Traction motors M are supported on the axles and extend therefrom to the adjacent support brackets, on which their nose portions are suspended.

At the juncture of side members 11 and transom 15 upwardly facing horizontal bearing surfaces 19, spaced apart and elongated normal to radii from the center of transom 17, i.e., transversely of the truck, are formed on the truck frame, and at the juncture of side members 11 and transom 17 similar bearing surfaces 21, spaced apart transversely of the truck and also elongated normal to radii from the center of transom 17, i.e., longitudinally of the truck, are formed in the truck frame.

Locomotive underframe U is formed with four downwardly open cylindrical pockets 23 normally vertically aligned respectively with the centers of bearing surfaces 19 and 21. Within pockets 23, plungers 25 are vertically slidably mounted, being urged downwardly therein by springs 27. To accommodate to nonparallelism between underframe U and the truck frame, resulting from variations in deflections of springs 27, at their lower ends, plungers 25 mount shoes 29 by means of a spherical bearing 31, and shoes 29 are slidably seated on truck frame bearing surfaces 19 and 21 for movement, respectively, generally transversely and longitudinally of the truck to accommodate swivel of the truck relative to the underframe.

To provide a swivel center, the central portion of transom 17 is thickened lengthwise of the truck as at 33 in the direction of middle axle 2, the thickened portion being formed with a transversely elongated rectangular aperture defined by longitudinally spaced transverse vertical walls 35 and 37, and transversely spaced longitudinal webs 39, 39. A vertical cylindrical post 42 depends rigidly from the underframe into the rectangular aperture. In the upper portion of this aperture a block 41 cylindrically apertured at 45 to form a cylindrical bearing for pivotal receipt of cylindrical post 42 is supported on the latter by a removable collar 44 and is spaced horizontally from webs 35, 37 and 39. At each side of block 41, compressible resilient sandwiches 43, each comprising a series of elastomeric pads interleaved with metal plates, are interposed between the block and the adjacent web 39, whereby to resiliently center the block in the rectangular aperture, thus providing a swivel center resiliently centered transversely of the truck, but unrestrained lengthwise of the truck.

For transmitting tractive (longitudinal) forces from the truck to the underframe, a second block 47 is similarly cylindrically apertured and mounted on the lower end of post 42 at the approximate level of the axes. Block 47 and transverse webs 35 and 37 are provided with opposing slidably engaging wear plates 49 and 51, thus preventing movement of block 47 lengthwise of the truck, but block 47 is unrestrained transversely. Accordingly transverse forces imparted to the truck frame by the axles are transmitted from the truck frame to the underframe at the level of the axles through webs 35 and 37, block 47 and post 42, thus substantially reducing load transference resulting from vertical offset of the truck-body longitudinal force-transmitting connection from the axle level, without interfering with normal swivel, lateral and vertical movements of the body relative to the truck.

The details of the construction described above may be varied without departing from the spirit of the invention, and the exclusive use of such modifications.

What is claimed is:

1. A railway truck comprising first and second wheeled axles spaced apart lengthwise of the truck, a rigid frame supported on said axles and including a pair of transversely spaced longitudinally extending side members and a transverse transom connecting said side members between said axles, said frame mounting a pair of upwardly facing bearings spaced apart transversely of the truck between said axles and adapted for horizontally slidable and vertically resilient support of an underframe, spaced transverse webs defining a vertical aperture in said transom, a block positioned in said aperture adjacent the top of said transom and in spaced relation with both of said transverse webs, means carried by said transom to yieldably center said block transversely of the truck, said block being vertically cylindrically apertured to pivotally receive a vertical cylindrical element rigidly depending from the underframe, said transom aperture being adapted to transversely slidably and pivotally receive the lower end of the vertical cylindrical element while holding the same against movement lengthwise of the truck.

2. A railway truck according to claim 1 in which a second block is positioned in said transom aperture at a level substantially lower than said first-named block and is cylindrically apertured to pivotally receive the lower end of the cylindrical element, said second block being freely slidable transversely of the underframe.

3. A railway truck according to claim 2 having a third axle spaced lengthwise of the truck from said second axle in the opposite direction from said first axle.

4. A railway truck according to claim 3 in which said first named bearings are disposed between said first and second axles and said frame mounts an additional pair of transversely spaced upwardly facing bearings between said second and third axles for horizontally slidable and vertically resilient support of the underframe.

5. A railway truck according to claim 2 wherein a traction motor is mounted on said second axle and extends therefrom away from the other end axle and said transom has a central portion projecting longitudinally of the truck toward said second axle, said transom aperture being formed in said projecting central portion of said transom.

6. A railway truck according to claim 5 having a third axle spaced longitudinally of the truck from said second axle in the opposite direction from said first axle, said frame mounting an additional pair of transversely spaced upwardly facing bearings between said second and third axles for horizontally movable and vertically resilient support of the underframe.

7. A railway truck according to claim 4 wherein all of said upwardly facing bearings are horizontal surfaces on said frame elongated normal to radii from said block apertures.

8. A railway truck according to claim 6 wherein said frame includes another transverse transom between said second and third axles, said upwardly facing bearings being positioned at the intersections of said frame side members and both said transoms.

9. A railway truck according to claim 8 wherein there are motors on said first and third axles extending therefrom toward said second axle, said first axle motor being supported from said first-named transom, said second and third axle motors being supported from said other transom.

10. A railway locomotive including a truck comprising first and second wheeled axles spaced apart lengthwise of the truck, a rigid frame supported on said axles and including a pair of transversely spaced longitudinally extending side members and a transverse transom connecting said side members between said axles, said frame mounting a pair of upwardly facing bearings spaced apart transversely of the truck between said axles, spaced transverse webs defining a vertical aperture in said transom, a block positioned in said aperture adjacent the top of said transom and in spaced relation with both of said transverse webs, means carried by said transom to yieldably center said block transversely of the truck, said block being vertically cylindrically apertured, and an underframe having downwardly facing vertically resiliently mounted bearings engageable with said upwardly facing bearings and a rigidly depending vertical cylindrical element pivotally received in said block and pivotally and transversely movably received in said transom aperture but held against movement therein longitudinally of the truck.

11. A railway locomotive according to claim 10, in which a second block is positioned in said transom aperture at a level substantially lower than said first-named block and is cylindrically apertured to pivotally receive the lower end of the cylindrical element, said second block being freely slidable transversely of the underframe.

12. A railway locomotive according to claim 11 in which said upwardly facing bearings are upwardly facing flat horizontal surfaces on said frame and said downwardly facing bearings on said underframe are downwardly facing vertically movable elements in slidable engagement with said upwardly facing frame surfaces.

References Cited

UNITED STATES PATENTS

| | | | |
|---|---|---|---|
| 844,151 | 2/1907 | Lindenthal | 105—199 |
| 1,544,125 | 6/1925 | Bell | 105—199 X |
| 2,499,087 | 2/1950 | Bourdon | 105—199 |
| 2,632,405 | 3/1953 | Ivatt | 105—199 X |
| 2,705,924 | 4/1955 | Travilla et al. | 105—199 X |
| 2,925,789 | 2/1960 | Wintemberg | 105—199 X |

ARTHUR L. LA POINT, *Primary Examiner.*

HOWARD BELTRAN, *Assistant Examiner.*

U.S. Cl. X.R.

105—175, 189, 196, 199